Figure 4:
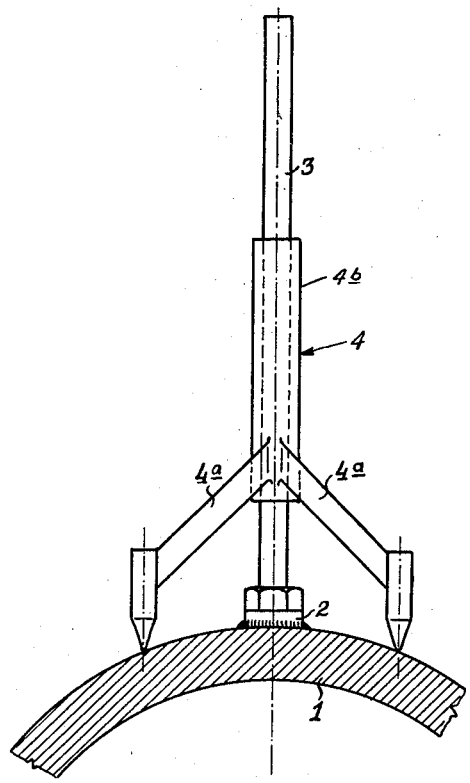

Dec. 30, 1958               A. CINK              2,866,631
HAND APPARATUS FOR FLAME CUTTING OF PERPENDICULAR
CYLINDRICAL APERTURES ON CYLINDRICAL SURFACES
Filed Sept. 25, 1956                             2 Sheets-Sheet 1
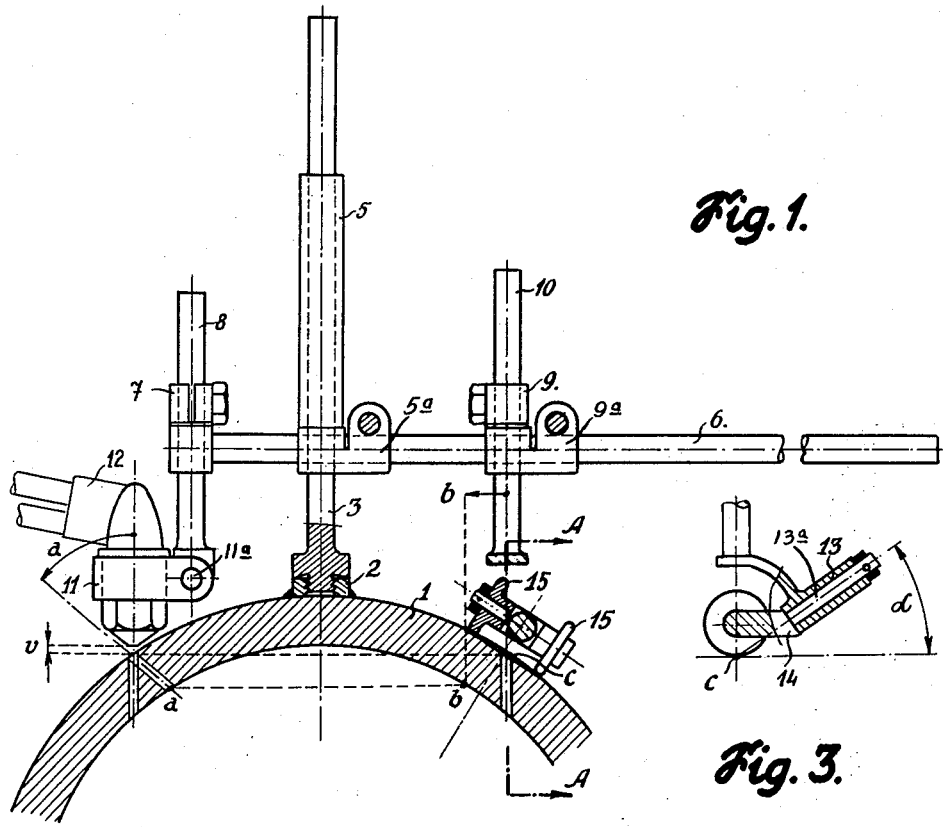
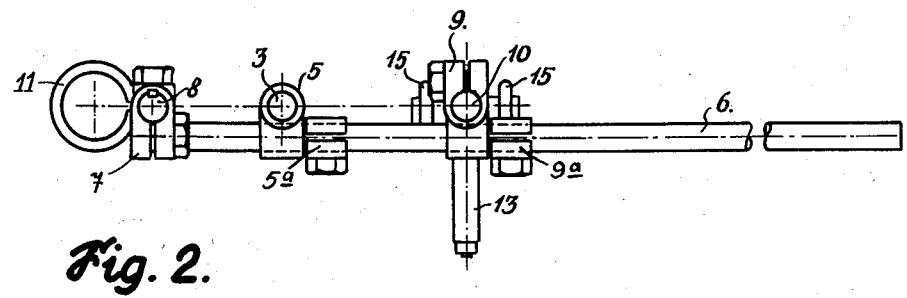
INVENTOR.
Albin Cink Dec. 30, 1958 A. CINK 2,866,631
HAND APPARATUS FOR FLAME CUTTING OF PERPENDICULAR
CYLINDRICAL APERTURES ON CYLINDRICAL SURFACES
Filed Sept. 25, 1956 2 Sheets-Sheet 2

INVENTOR.
Albin Cink
BY

United States Patent Office 2,866,631
Patented Dec. 30, 1958

2,866,631

HAND APPARATUS FOR FLAME CUTTING OF PERPENDICULAR CYLINDRICAL APERTURES ON CYLINDRICAL SURFACES

Albín Cink, Vsetín, Czechoslovakia

Application September 25, 1956, Serial No. 611,989

2 Claims. (Cl. 266—23)

The present invention relates to a hand operated apparatus for flame cutting of perpendicular cylindrical apertures on cylindrical surfaces.

When laying a pipe line, or in the production of cylindrical bodies it is sometimes necessary to cut cylindrical apertures to which branch pipes have to be welded. Such apertures according to requirements are formed with or without chamfers. For a correct cutting of the apertures the following conditions have to be fulfilled:

(1) The axis of the cutting apparatus must be at right angles to the generatrix of the cut cylindrical surface and must pass through the axis of the latter.

(2) The axis of the burner must retain a constant distance from the axis of the apparatus or a constant adjusted direction with respect to the apparatus during the cutting operation.

(3) The mouth of the burner nozzle must have a practically constant distance from the cut surface during the cutting operation.

The hitherto known devices for cutting such apertures are either intricate or do not fulfill all the above mentioned conditions.

Workshop machines are controlled mechanically and use templates or cams. In outdoor assembly work, the welder first marks the apertures on the surface of the tube or body by means of a developed template and then cuts the aperture with a burner guided by hand. An aperture roughly cut in this way requires further adjustments by filing, grinding, chopping and the like.

With the hand apparatus according to the invention such apertures may conveniently be cut in any working positions, with or without chamfer and with considerable accuracy.

The apparatus embodying the invention comprises diametrically opposed supports for a burner and copying rollers which are mounted slidably on an axle rigidly secured to the cylindrical surface of the tube at the center of the aperture to be cut. A constant distance of the mouth of the burner nozzle from the surface to be cut is maintained by reason of the fact that the penetration curve of a perpendicular circular aperture is symmetrical to the axle of the apparatus, and the fact that to each point below the burner there corresponds at the opposite side of the curve a point at the same height. From the latter point therefore the height of the nozzle may be derived, and this is carried out by means of a particular copying device, consisting of the copying rollers.

An advantage of this arrangement is the fact that during the cutting operation the copying rollers are out of reach of the flame, are not burnt and the cut may be easily observed. With the apparatus according to the invention it is further possible to cut correctly both outer and inner chamfers, when the distance of the burner from the axis of the apparatus is different from the distance of the centre of the rollers.

The accompanying drawing shows by way of example a hand operated apparatus according to the invention for flame cutting of perpendicular cylindrical apertures in cylindrical surfaces.

Figure 5:
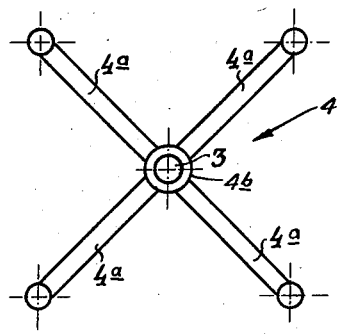

Fig. 1 shows in elevation the apparatus in a frontal position, at right angles to the tube to be cut, Fig. 2 is a plan view of the apparatus according to Fig. 1, Fig. 3 is a partial section of the copying device along the line A—A of Fig. 1, Fig. 4 represents in an elevational view an auxiliary member for securing the axis of the apparatus, and Fig. 5 is a plan view of the auxiliary member according to Fig. 4.

The disc which is to be cut from the tube 1 is waste material. There are therefore no objections to welding thereon a nut 2 for carrying an axle 3 of the apparatus which is screwed therein, and which is positioned perpendicular to a plane tangent to the surface of the tube 1 during welding of the nut by an auxiliary member 4. The auxiliary member 4 has four arms 4a extending generally radially from one end of a tube 4b that is adapted to slidably receive the axle 3, and the ends of the arms 4a form the apices of a square or rectangle and are placed on two generatrices of the cylindrical surface so as to cause the axle 3 to assume the required position.

After welding-on the nut 2, the auxiliary member 4 is removed and on the axle 3 of the machine a tubular guide 5 is fitted, which is adapted for sliding movement and rotation on the axis 3. Perpendicularly to the axis of the tubular guide 5, the latter has a clamp 5a in which a bar 6 is adjustably mounted. The bar 6 carries, at one end, a clamp 7 holding a rod 8 extending parallel with the axis of the tubular guide 5 for supporting a burner 12. At the side of the guide 5 remote from rod 8, the bar 6 has a clamp 9a adjustable therealong and integral with a clamp 9 for adjustably securing a stem 10 extending perpendicular to the bar 6 for supporting copying rollers 15.

A sleeve 11 carrying the burner 12 is adjustably pivoted, as at 11a, on the rod 8. Thus, the burner is mounted for rotation with the sleeve 11 relative to the rod 8 and may therefore be adjusted into inclined position according to the chamfer of the aperture to be cut. At the lower end of the stem 10 is a bearing 13 for an axle 13a secured to a beam 14 which rotatably carries two copying rollers 15. The sleeve 11 for the burner and the copying rollers are placed with respect to the axle 3 of the apparatus at opposite sides in such a manner that the axis of the burner nozzle and the point "c" copied by the copying rollers 15 are practically in one plane extending diametrically through the axle 3.

The spacial curve of the cut being symmetrical to the axis 3 of the apparatus, the height "v" of the nozzle of the burner 12 may be derived from the diametrically opposed point "c" on the section curve. Considering that after the burner has been revolved by 180°, a groove or slot is cut underneath the axis of the stem 10, a single point contact for maintaining the height "v" of the mouth of the burner nozzle cannot be used. For copying the section curve two rollers are therefore used, which bridge the slot. In order that the point "c" copied by the said rollers should lie on the penetration curve of the section, the axis of the bearing 13 serving for the rotation of the beam 14 has to be deflected so as to form an acute angle α with a plane perpendicular to the axis of the apparatus defined by the axle 3 and to intersect the enveloping cylinder of the surface of the rollers 15 practically in the same point. Due to this measure a practically constant height "v" of the mouth of the burner nozzle above the surface of the cut tube or body is achieved even during the tilting or rotational movement of the roller beam 14 while the rollers 15 travel along the surface of the tube.

The cutting of the aperture is carried out in such a way that in the interior of the disc an orifice is burnt by hand with the burner, whereupon the cut is proceeded with as far as the curve of the cut. The burner is then inserted into the sleeve 11 and rotated around the axis of the apparatus by gripping the lateral bar 6 at its protruding end. If a cut with a chamfer is required, the sleeve 11 of the burner is inclined as required, for example into the position "a—a" and the axis of the stem 10 carrying the copying rollers 15 is displaced on the lateral bar 6 to the position "b—b," so as to pass through the curve of the cut at the inner surface of the tube or body. This is necessary in order to make the inner edge of the aperture lie on the outer cylinder of the branch tube to be attached. The rollers then copy the inner curve according to its projection on the surface of the tube or body.

I claim:

1. A hand operated apparatus for flame cutting perpendicular cylindrical apertures in cylindrical tubes; comprising a post, means for securing said post to the surface of a tube at the center of an aperture to be cut in the latter, with said post extending perpendicular to a plane tangent to the surface of the tube at said center of the aperture, supporting means rotatable and axially slidable on said post, a burner, copying rollers, means mounting the burner on said supporting means at one side of the post and a desired distance in the direction of the axis of the burner away from a point on a spacial curve along which the aperture is to be cut, and means mounting the copying rollers on said supporting means at the opposite side of the post to cause the copying rollers to contact the surface of the tube, the mounting means for the burner and copying rollers being arranged to dispose both the axis of the burner and a point on the line of contact of said rollers with the surface of the tube, lying midway between the rollers, in a plane extending diametrically through the axis of the post, so that, as the supporting means is rotated about the post, the burner is displaced in the direction of the post and caused to move along, and to remain at the same distance from, the spacial curve, while the copying rollers are caused to move likewise along the spacial curve and, additionally, to permanently roll on the surface of the tube, the burner, on the one hand, and said point, on the other, always remaining during their rotation, with respect to the post, in a diametrically opposite position.

2. A hand operated apparatus as in claim 1; wherein said means mounting the copying rollers on said supporting means includes a bearing carried by said supporting means and a member rotatably carrying said rollers and turnably mounted in said bearing, said bearing defining a turning axis for said member carrying the rollers which is inclined at an acute angle relative to a plane perpendicular to said axis of the post, while said turning axis defined by the bearing intersects said plane perpendicular to the axis of the post approximately at said point on the line of contact of said rollers with the surface of the tube to be cut.

References Cited in the file of this patent

UNITED STATES PATENTS

| | | |
|---|---|---|
| 2,142,436 | Clabeaux | Jan. 3, 1939 |
| 2,460,826 | Hooser et al. | Feb. 8, 1949 |
| 2,497,853 | Arnold et al. | Feb. 21, 1950 |
| 2,547,320 | Hedley | Apr. 3, 1951 |
| 2,756,987 | Willoughby | July 31, 1951 |

FOREIGN PATENTS

| | | |
|---|---|---|
| 216,960 | Germany | Dec. 8, 1909 |
| 541,389 | Great Britain | Nov. 25, 1941 |